3,326,980
PREPARATION OF METHYL MERCAPTAN FROM WASTE PULPING LIQUORS
David W. Goheen, Camas, Wash., assignor to Crown Zellerbach Corporation, San Francisco, Calif., a corporation of Nevada
No Drawing. Filed Dec. 11, 1964, Ser. No. 417,793
9 Claims. (Cl. 260—609)

This invention relates to the preparation of methyl mercaptan from the waste liquors of pulping operations.

In the chemical pulping of wood to obtain cellulose fibers for the manufacture of paper, about 50% by weight of the wood is removed by the cooking liquor as non-fibrous material. Most of the non-fibrous material is lignin, which is made up of substituted phenyl propane units, the phenyl group having a methoxyl moiety thereon. Waste liquor from the pulping process is burned in recovery furnaces to recover the pulping chemicals and to burn the lignin and other non-fibrous materials obtained from the wood because of pollution considerations, and to obtain heat values therefrom. Naturally, this loss constitutes a great economic waste, and many efforts have been made to obtain useful chemical products from lignin.

It is known that dimethyl sulfide and methyl mercaptan may be obtained from unsulfonated lignin-containing waste liquors obtained from pulping processes. Thus, the Hagglund et al. U.S. Reissue Patent No. Re. 24,293 discloses obtaining methyl sulfite and methyl mercaptan from sulfate black liquor by adding an inorganic sulfidic sulfur compound to the black liquor, heating the mixture at temperatures of from 150° to 500° C., and recovering methyl sulfide and methyl mercaptan therefrom. In Hagglund et al. the yield of methyl sulfide and methyl mercaptan is about 1.1% and 1.2% respectively, based on the liquor solids. In the Ball et al. U.S. Patent No. 2,976,273, the Hagglund et al. process is modified to decrease the yield of methyl mercaptan to a negligible amount by omitting the addition of any sulfur compounds to the waste liquor, and conducting the heating at high pressure, above about 700 p.s.i. to cause the formation of dimethyl sulfiide which is later flashed off and condensed. In my prior U.S. Patent No. 2,840,614 I have disclosed a process of making methyl mercaptan comprising adding sulfur bearing materials to black liquor of less than about 60% solids, heating the mixture in an autoclave, continuously venting methyl mercaptan vapors as they are formed and condensing the methyl mercaptan in a cold trap.

While this latter process of producing methyl mercaptan by continuous venting is relatively successful when practiced on a laboratory scale, when the process is scaled up to commercial size many problems arise due to the difficulty in flashing methyl mercaptan from the large body of liquid involved, and the yield is substantially lowered.

It has been found that methyl mercaptan can be produced as the predominant product from waste pulping liquor by evaporating the liquor essentially to dryness, tumbling the resultant solids while subjecting said solids to mild pyrolysis, and continuously removing methyl mercaptan vapors as they are formed. When the waste liquor is sulfite or soda waste liquor, sulfur containing material must be added to the waste liquor prior to treatment; but when the waste liquor is sulfate waste liquor, it has been found that no sulfur containing material need be added. By "tumbling" I mean any procedure for moving the dried liquor particles about in the pyrolysis zone to effect uniformity of heating and uniformity of exposure of the surface of the individual particles to free space in the zone. By this process, approximately 60% to 70% of the available methoxyl groups in the lignin are recovered, predominantly as methyl mercaptan, with a minor amount of dimethyl sulfide.

The starting material for the production of methyl mercaptan in one embodiment of the process disclosed herein is the waste liquor from sulfate (Kraft) pulping, referred to in the art as "black" liquor. Black liquor as it comes from the brown stock washers contains about 16% by weight of solids. These solids are the reacted cooking chemicals, which are various sodium salts, such as sodium carbonate, sodium hydroxide, sodium sulfide, sodium sulfate, sodium sulfite and others, as well as modified lignin removed from the wood chips in the pulping operation. The black liquor is concentrated to a solids content of about 40% to 60% by weight in evaporators. The next step in the conventional sulfate process is the recovery of the cooking chemicals by burning the concentrated liquor in a recovery furnace, combustion being supported by the lignin and other extracts from the wood, the cooking chemicals being recovered as a smelt at the bottom of the furnace. The smelt from the recovery furnace is dissolved in water forming "green" liquor, which is composed mainly of sodium sulfide, sodium sulfate and sodium carbonate. This green liquor is causticized with calcium hydroxide to convert the sodium carbonate to sodium hydroxide. The resulting liquor is called "white" liquor and is the liquor employed in the pulping process.

In the process of one embodiment of this invention the concentrated sulfate black liquor, having a solids content in the neighborhood of 40% to 60% and pH in the range of 9 to 13, preferably 11 to 13, is dried substantially to dryness in any suitable manner, taking care to maintain the temperature low enough during drying so as not to liberate any methyl mercaptan. For this purpose, the temperature should be maintained below about 150° C., but high enough to effect the drying at a reasonable rate, preferably above about 100 degrees C. The drying may be effected by any conventional means or combination of means, as long as the temperature limitation just mentioned are observed. The drying may be effected in the same means employed to effect pyrolysis, in a separate means, or by a combination of the two.

The dried solids are next subjected to mild pyrolysis at temperatures from 150° C. to 500° C., preferably at from about 150° C. to 300° C. Below 150° C. methyl mercaptan is not evolved. Above 500° C. the lignin is broken down into phenolic materials, and there is a danger of charring. During pyrolysis it is important to continuously remove the methyl mercaptan that is formed; otherwise, the methyl mercaptan that is formed is quickly converted into dimethyl sulfide. One of the reasons for the lack of success of my former process for the production of methyl mercaptan, described in the aforementioned U.S. Patent No. 2,840,614, was the inability on a large scale to remove methyl mercaptan that was formed from the large body of liquid material. It has been found that in the instant process continuous removal of methyl mercaptan is easily accomplished due to the fact that dried particulate material is being employed. The removal of methyl mercaptan is aided by tumbling the dried material, permitting any methyl mercaptan that is evolved to be quickly released from the dried mass of material and safely removed from the pyrolyzation zone. Tumbling also has the advantage of helping to break up the dried liquor solids into a particulate mass. This break-up may be further aided by the presence of rods or balls during tumbling. The heating of the pyrolysis zone should be carried out indirectly since with direct heating the products of combustion of the fuel mix with the pyrolyzate as impurities, and the pyrolyzate may be exposed to hot zones where it can burn. Tumbling the dried liquor solids further aids in assuring uniformity of heating.

The vapors that are evolved during pyrolyzation are led from the pyrolysis zone to a cold condenser, where methyl mercaptan along with a minor amount of dimethyl sulfide and other materials are condensed and collected. The methyl mercaptan may then be separated from the other materials by conventional procedures.

The residue after pyrolysis is a soft powder that is easily suspended in additional black liquor which is fed to a conventional recovery furnace for recovery of the cooking chemicals.

The following example illustrates a specific embodiment of the described process. It is to be understood that the conditions set forth therein are illustrative only and not intended to be limiting.

*Example 1*

1500 grams of 42% by weight solids black liquor obtained from sulfate pulping of mainly Douglas fir wood was placed into a horizontal rotating-type furnace heated externally by conventional electric heaters. The outlet end of the furnace was raised slightly to prevent boil over of the liquid. At the outlet end of the furnace was a journaled fixture connected to first a water cooled condenser and then to a Dry Ice cooled trap. The black liquor was first evaporated substantially to dryness at from about 110° to 140° C. After the water was evaporated from the liquor the temperature was raised to about 300° C., the furnace being rotated at about 30 r.p.m. At about 150° to 160° C. material began to collect in the Dry Ice trap. The temperature was held at 300° C. for about 2 hours, although most of the product was obtained in one hour. The run was stopped and the liquor solids found to be light and powdery. There was only a trace of material in the water cooled condenser, but in the Dry Ice cooled trap was 16 grams of material which was analyzed by gas chromatography and found to consist of the following: 2 parts $CO_2$, 11 parts $H_2S$, 59 parts methyl mercaptan, 22 parts dimethyl sulfide, and 8 parts other components. The yield of methyl mercaptan, based on the liquor solids, was 1.5%, and the yield of dimethyl sulfide was 0.6%.

This compares with a yield of 1.2% methyl mercaptan and 1.1% dimethyl sulfide calculated from the results of the example disclosed in the Hagglund et al. patent. It is to be emphasized that in my Example 1 above, no sulfur containing compound was added to the black liquor, while in the Hagglund example 34 grams or about 6% based on the liquor solids of sodium sulfide was added. It is thus seen that by the process disclosed herein, a slightly better yield of methyl mercaptan and a substantially reduced amount of dimethyl sulfide are obtained over that of the prior art without the addition of any material whatsoever to the black liquor. The sulfur required for the conversion of the methoxyl groups on the lignin to methyl mercaptan comes from those sulfur compounds already present in the black liquor as exhausted cooking chemicals.

The reduction in the amount of dimethyl sulfide that would otherwise be formed (as in Hagglund et al. for example) is an important feature of this invention. To illustrate how the process conditions herein described cause a decrease in dimethyl sulfide formation, in the example below a run was made employing the addition of sodium sulfide to the black liquor, as in the example of Hagglund et al., but with tumbling during pyrolysis as in Example 1.

*Example 2.*

A run was made under the same conditions as given in Example 1 with the exception that 123 grams of $Na_2S \cdot 9H_2O$ (40 grams anhydrous $Na_2S$ or about 6% based on the liquor solids) was added to 1500 grams of 42% solids sulfate black liquor. Again, only a trace of material was collected in the water cooled condenser, but in the Dry Ice trap was 14 grams of material which was analyzed by gas chromatography and found to consist of the following: 1 part $CO_2$, 15 parts $H_2S$, 58 parts methyl mercaptan, 24 parts dimethyl sulfide, and 2 parts other materials. The yield of methyl mercaptan, based on the liquor solids, was 1.3%, and the yield of dimethyl sulfide was 0.5%.

As is seen from Example 2, the yield of methyl mercaptan is substantially the same as that of Hagglund et al., but the formation of dimethyl sulfide has been substantially reduced. It is believed that this reduction in dimethyl sulfide formation may be attributed to at least two features of the described process, which appear to coact in a manner to be described. The first feature is that of drying the black liquor substantially to dryness before commencing pyrolysis to any degree whatsoever. The second feature is that of removing the methyl sulfide vapors from the pyrolyzation zone substantially as soon as they are formed. This latter is effected by tumbling the dried solids during pyrolysis, which permits vapor to escape from the dried mass, and immediately removing the vapors to the Dry Ice trap by virtue of the geometry of the reactor. These two features are believed to coact by virtue of the following considerations. Since the black liquor is dried substantially to dryness, it is possible to obtain a particulate mass which exposes a large surface area. This large surface area permits the evolution of methyl mercaptan at many more points than if a large body of liquid were employed, as in my aforementioned U.S. Patent No. 2,840,614. Any moisture present inhibits this evolution by virtue of the space the water molecules take up. By tumbling the dried particles during pyrolysis, this large surface area gives any methyl mercaptan that is formed a chance to readily escape to free space in the pyrolysis zone and hence to the condenser. Without the tumbling action, the advantage of the large surface area afforded by employing dried particles would be largely lost due to the occlusion of any evolved methyl mercaptan in pockets, which would in turn cause the formation of dimethyl sulfide due to long exposure to pyrolysis conditions.

While the addition of sulfur containing compounds to sulfate black liquor is not necessary to obtain methyl mercaptan by the herein disclosed process, it has been found that the yield of methyl mercaptan from sulfate black liquor is almost doubled with no increase in dimethyl sulfide formation if elemental sulfur is added to the black liquor prior to treatment. The following example illustrates this.

*Example 3*

The process of Example 1 was repeated with the exception that 16 grams of elemental sulfur (about 3% based on the liquor solids) was added to 1500 grams of 42% solids sulfate black liquor. As before, only a trace of material was found in the water cooled condenser, but in the Dry Ice trap was 24.3 grams of material which was analyzed by gas chromatography and found to consist of the following: 1 part $CO_2$, 15 parts $H_2S$, 66 parts methyl mercaptan, 15 parts dimethyl sulfide, and 3 parts other materials. Based on the black liquor solids, the methyl mercaptan yield was 2.5% and the dimethyl sulfide yield was 0.6%.

The following table compares the results of Examples 1 to 3 and the example given in the Hagglund et al. patent. The percentages contained therein are by weight and based on the total liquor solids.

METHYL MERCAPTAN YIELDS COMPARED

| Example No. | Sulfur Added | Tumbling | Methyl Mercaptan Yield, Percent | Dimethyl Sulfide Yield, Percent |
|---|---|---|---|---|
| 1 | None | Yes | 1.5 | 0.6 |
| 2 | 6% $Na_2S$ | Yes | 1.3 | 0.5 |
| 3 | 3% S | Yes | 2.5 | 0.6 |
| Hagglund | 6% $Na_2S$ | No | 1.2 | 1.1 |

It is readily seen that by employing the process described herein, the formation of dimethyl sulfide is substantially suppressed. It is also readily seen that by employing the process of this invention no sodium sulfide need be added to sulfate black liquor to obtain a good yield of methyl mercaptan. It is further seen that the addition of a small quantity of elemental sulfur to the black liquor almost doubles the yield of methyl mercaptan over that obtained with either the use of no sulfur compound addition or with the addition of sodium sulfide, with no increase in dimethyl sulfide formation.

The foregoing examples and description are all directed to obtaining methyl mercaptan from sulfate waste liquor. The same general procedure is also applicable to obtaining methyl mercaptan from sulfite or soda waste liquor, except that with sulfite and soda waste liquors, the addition of elemental sulfur or inorganic sulfidic sulfur containing substance is essential. This is due to the fact that in the sulfite or soda pulping process, the details of which are well known and will not be gone into here, there are no inorganic sulfidic sulfur containing compounds present in the waste liquor derived from the cooking chemicals. Therefore, in order to produce methyl mercaptan from the methoxyl groups of the lignin extracted from the wood during digestion, sulfur or sulfur containing material must be added to the waste liquor. Suitable sulfur containing materials are those disclosed in my aforementioned U.S. Patent No. 2,840,614. Hereinafter whenever I refer to sulfur, I intend to mean either elemental sulfur or suitable sulfur containing materials such as inorganic sulfidic sulfur compounds. The amount of sulfur added to the waste liquor is stoichiometrically determined from the methoxyl content of the particular waste liquor employed as the starting material.

The following example illustrates the use of sulfite waste liquor as the starting material in the process of this invention:

Example 4

To 1500 grams of Orzan SL–50, a sodium base spent sulfite liquor product having a solids content of 50%, was added 138 grams $Na_2S \cdot 9H_2O$ (45 grams of $Na_2S$) and 13.5 grams of elemental sulfur. The mixture was placed into the rotating furnace as described in the previous examples and the process followed was the same as that previously described. There was obtained 12.6 grams of material consisting of the following: 2 parts $CO_2$, 21 parts $H_2S$, 64 parts methyl mercaptan, 9 parts dimethyl sulfide, and 4 parts other materials. The yield of methyl mercaptan was 1.1% and that of dimethyl sulfide was 0.2%, based as the liquor solids. It is seen, therefore, that by employing the herein described process the yield of dimethyl sulfide is also suppressed when employing sulfite waste liquor as the starting material. The same is true when soda waste liquor is employed as the starting material.

While in the foregoing examples the tumbling of the dried black liquor powder was effected by means of a rotating furnace, the tumbling action could be effected by other means, and the description of one specific embodiment of such a means is intended to be by way of example only, and not limiting. The tumbling could be effected, for example, by the use of other well known means such as a fluidized bed wherein the fluidizing gas is chosen so as not to affect the reaction and which aids in carrying the methyl mercaptan vapors to the condenser.

Having described the nature of my invention and the manner of its operation, what I claim is:

1. The process of preparing methyl mercaptan from sulfate black liquor containing as sulfur compounds only those present as exhausted cooking chemicals comprising:
   evaporating said black liquor substantially to dryness;
   subjecting the resulting solids to tumbling;
   subjecting said solids to a mild pyrolysis in a pyrolysis zone at a temperature of from about 150° C. to about 300° C. during said tumbling to cause the formation of vaporous methyl mercaptan;
   substantially immediately removing said vaporous methyl mercaptan from said pyrolysis zone;
   and recovering said methyl mercaptan.

2. The process of preparing methyl mercaptan from sulfate black liquor containing as sulfur compounds only those present as exhausted cooking chemicals comprising:
   evaporating said black liquor substantially to dryness at a temperature less than that at which methyl mercaptan is formed but high enough to effect evaporation at a reasonable rate;
   subjecting the resulting solids to tumbling;
   subjecting said solids to mild pyrolysis in a pyrolysis zone at a temperature of from about 150° C. to about 300° C. during said tumbling to cause the formation of vaporous methyl mercaptan;
   substantially immediately removing said vaporous methyl mercaptan from said pyrolysis zone;
   and recovering said methyl mercaptan.

3. The process of claim 2 wherein said evaporation is effected at a temperature of from about 100° C. to 150° C.

4. The process of claim 2 wherein sulfur is added to said black liquor in the amount of up to 15% by weight of the black liquor solids.

5. The process of claim 4 wherein said sulfur is elemental sulfur.

6. The process of preparing methyl mercaptan from waste pulping liquor comprising:
   adding sulfur to said waste liquor in an amount sufficient to react with the methoxyl groups in the lignin;
   evaporating said waste liquor substantially to dryness at a temperature less than that at which methyl mercaptan is formed but high enough to effect evaporation at a reasonable rate;
   subjecting the resulting solids in said pyrolysis zone to tumbling;
   subjecting said solids to mild pyrolysis in a pyrolysis zone at a temperature of from about 150° C. to about 300° C. during said tumbling to cause the formation of vaporous methyl mercaptan;
   substantially immediately removing said vaporous methyl mercaptan from said pyrolysis zone;
   and recovering said methyl mercaptan.

7. The process of claim 6 wherein said waste liquor is sulfate waste liquor.

8. The process of claim 6 wherein said waste liquor is sulfite waste liquor.

9. The process of claim 6 wherein said waste liquor is soda waste liquor.

No references cited.

CHARLES B. PARKER, *Primary Examiner.*

DELBERT R. PHILLIPS, *Assistant Examiner.*